US010714817B2

(12) United States Patent
Koch

(10) Patent No.: US 10,714,817 B2
(45) Date of Patent: Jul. 14, 2020

(54) ANTENNA DEVICE FOR A RADAR DETECTOR HAVING AT LEAST TWO RADIATION DIRECTIONS, AND MOTOR VEHICLE HAVING AT LEAST ONE RADAR DETECTOR

(71) Applicant: AUDI AG, Ingolstadt (DE)

(72) Inventor: Niels Koch, Reichertshofen (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 16/307,277

(22) PCT Filed: Mar. 8, 2017

(86) PCT No.: PCT/EP2017/055445
§ 371 (c)(1),
(2) Date: Feb. 1, 2019

(87) PCT Pub. No.: WO2017/211472
PCT Pub. Date: Dec. 14, 2017

(65) Prior Publication Data
US 2019/0267703 A1 Aug. 29, 2019

(30) Foreign Application Priority Data
Jun. 7, 2016 (DE) .................. 10 2016 007 434

(51) Int. Cl.
H01Q 1/32 (2006.01)
G01S 7/03 (2006.01)
(Continued)

(52) U.S. Cl.
CPC .......... H01Q 1/3233 (2013.01); G01S 7/032 (2013.01); G01S 13/931 (2013.01); H01Q 1/38 (2013.01);
(Continued)

(58) Field of Classification Search
CPC ........ H01Q 1/3233; H01Q 19/10; H01Q 1/38; G01S 7/032; G01S 13/931
(Continued)

(56) References Cited

U.S. PATENT DOCUMENTS 5,867,111 A * 2/1999 Caldwell ............ H03K 17/9622
200/600
5,867,131 A * 2/1999 Camp, Jr. ............. G06F 1/1616
343/797

(Continued)

FOREIGN PATENT DOCUMENTS

CN 103022715 A 4/2013
DE 19947783 A1 8/2001
(Continued)

OTHER PUBLICATIONS

International Search Report and Written Opinion of the International Search Authority directed to related International Patent Application No. PCT/EP2017/055445, dated May 22, 2017, with attached English-language translation; 18 pages.
(Continued)

Primary Examiner — Bo Fan
(74) Attorney, Agent, or Firm — Sterne, Kessler, Goldstein & Fox P.L.L.C.

(57) ABSTRACT

Antenna device for a radar detector, which has a circuit board having an electrically insulating substrate, on which a respective electrically conductive layer is arranged on each of two opposing sides, wherein the layer of at least one first side is configured as at least one main antenna. According to the invention, in addition to the at least one main antenna in each case, at least one antenna structure is provided which is integrated with the substrate, wherein each antenna structure integrated with the substrate comprises: a plurality of cutouts which are formed in the substrate and arranged in a waveguide and in each of which an electrically conductive
(Continued)

material is arranged at least partially, and a feeder cable formed by the electrically conductive layer of one of the sides for feeding an electromagnetic wave into the antenna structure integrated with the substrate.

11 Claims, 6 Drawing Sheets

(51) Int. Cl.
G01S 13/931 (2020.01)
H01Q 1/38 (2006.01)
H01Q 19/10 (2006.01)
H01Q 21/29 (2006.01)
H01Q 25/00 (2006.01)
H01P 5/107 (2006.01)
H01Q 21/00 (2006.01)
H01Q 13/02 (2006.01)

(52) U.S. Cl.
CPC .............. *H01Q 19/10* (2013.01); *H01Q 21/29* (2013.01); *H01Q 25/00* (2013.01); *H01P 5/107* (2013.01); *H01Q 13/02* (2013.01); *H01Q 21/0075* (2013.01)

(58) Field of Classification Search
USPC ..... 343/711, 777, 786; 342/28, 175, 32, 114
See application file for complete search history.

(56) References Cited

U.S. PATENT DOCUMENTS

| | | |
|---|---|---|
| 7,639,173 B1 | 12/2009 | Wang et al. |
| 2007/0216587 A1* | 9/2007 | Schmidt ............... H01Q 9/0407 343/711 |
| 2015/0070231 A1* | 3/2015 | Park ....................... H01Q 21/08 343/777 |
| 2015/0156888 A1* | 6/2015 | Kawai .................... H05K 3/423 205/125 |
| 2015/0326071 A1* | 11/2015 | Contopanagos ........ H02J 7/025 307/104 |

FOREIGN PATENT DOCUMENTS

| | | |
|---|---|---|
| DE | 102006019054 A1 | 10/2007 |
| DE | 102010034525 A1 | 2/2011 |
| DE | 102013017263 A1 | 4/2015 |

OTHER PUBLICATIONS

International Preliminary Report on Patentability directed to related International Patent Application No. PCT/EP2017/055445, dated Dec. 20, 2018, with attached English-language translation; 12 pages.

* cited by examiner

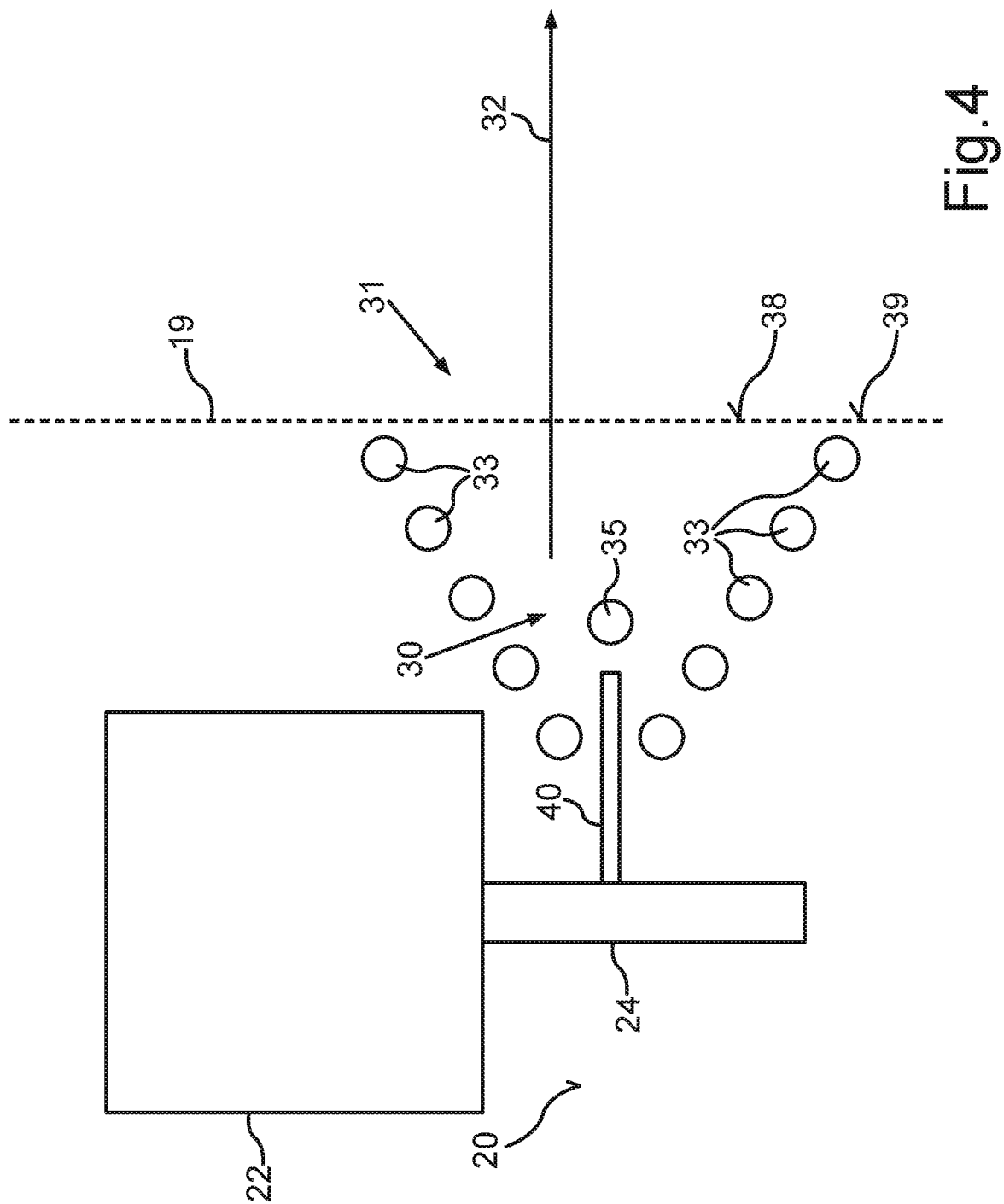

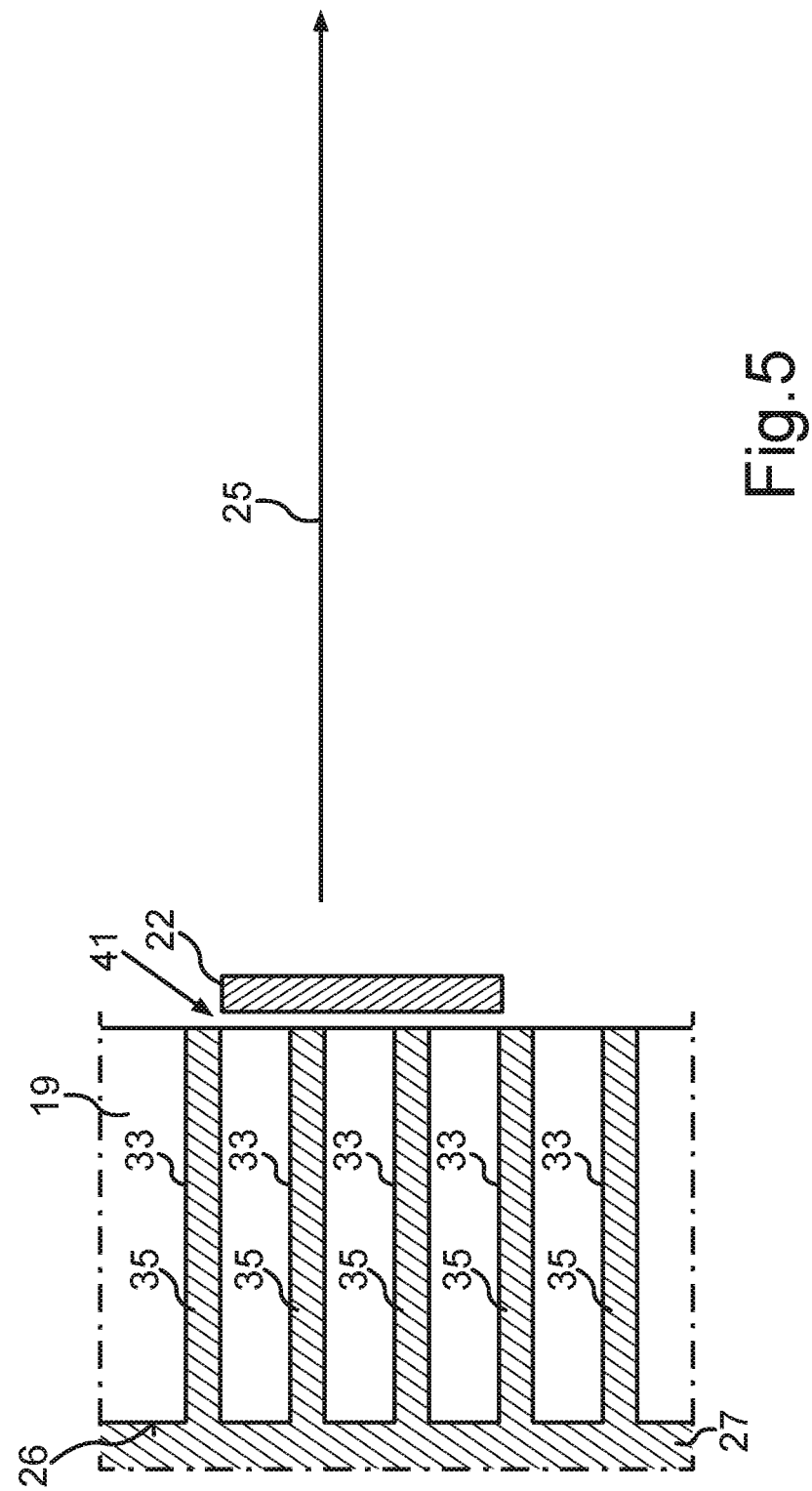

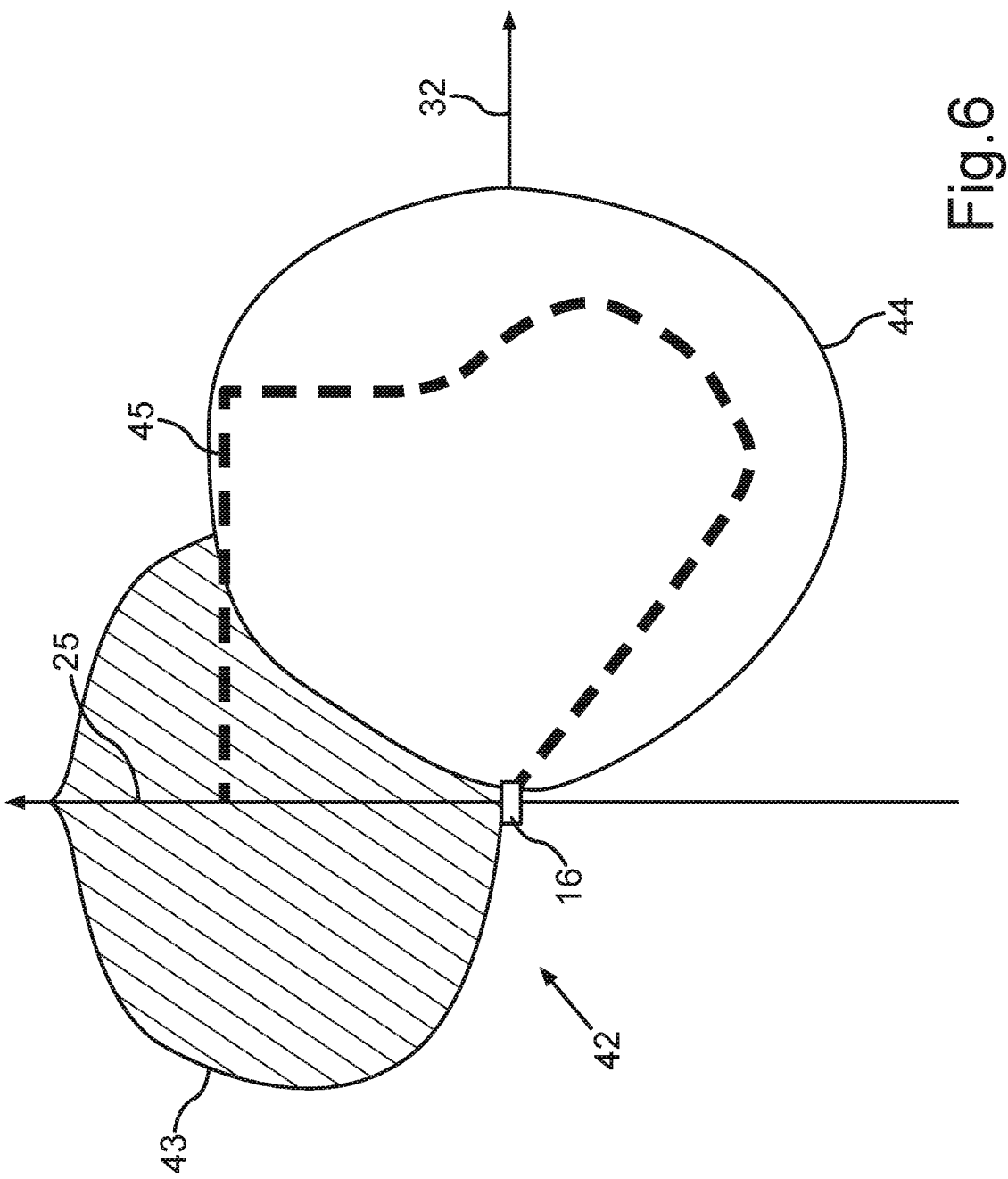

ANTENNA DEVICE FOR A RADAR DETECTOR HAVING AT LEAST TWO RADIATION DIRECTIONS, AND MOTOR VEHICLE HAVING AT LEAST ONE RADAR DETECTOR

TECHNICAL FIELD

The present disclosure relates to an antenna device for a radar detector having at least two radiation directions as it can be provided for example in a motor vehicle. The present disclosure further includes a motor vehicle having at least one radar detector for detecting or registering objects in an environment or in an interior of the motor vehicle.

BACKGROUND

Currently, radar sensors or radar detectors with a simple radiation characteristic are used. That means that a radar antenna transmits preferably in a main radiation direction and receives from this direction. The monitoring range for a number of radar applications is broader, however, than what one radar antenna alone can cover. Consequently, generally two or more than two independent radar antennas are used, which each cover a separate angular range by having their main radiation directions arranged at an angle to each other. This way, the two radiation characteristics of the radar antennas overlap to form a broader overall characteristic. In aggregation, the entire monitoring range is detected by the different radar antennas.

To provide an antenna device that is as compact as possible, the goal is to arrange the radar antennas required to cover a specified monitoring range or detection range on a single printed circuit board (PCB—Printed Circuit Board). When several radar antennas are arranged on a single circuit board, however, this board becomes too large. This prevents a more compact arrangement of a radar detector.

Conversely, if the range is specified, a circuit board is desired on which as many radar antennas as possible can be used in the same main radiation direction to improve or increase the spatial resolution of the radar detector.

SUMMARY

The present disclosure relates to the task of providing an antenna device in which at least two radar antennas with different main radiation directions are provided in a compact manner and in which only one feeding point is used.

The task is solved by the subject matters of the independent claims. Further developments of the present disclosure are disclosed by the features of the dependent claims, the following description as well as the figures.

The present disclosure comprises an antenna device for a radar detector. In the antenna device, at least two radar antennas are provided on a shared circuit board. While the antenna is arranged on the front side of the circuit board, the second antenna is configured so that a radiation direction that is different from the first antenna is formed. This can be achieved by providing an antenna structure with an integrated substrate or by arranging an antenna on the back side of the circuit board. It is furthermore conceivable to configure both an antenna on the front side, the back side, and at the same time as an antenna integrated with the substrate. All antennas are supplied by only one feed.

To this purpose, the circuit board has an electrically insulating substrate on which an electrically conductive layer is arranged on two opposing sides. The layer may be formed from copper as an electrical conductor. At least one main antenna is configured or provided in the electrically conductive layer of a first of the sides, for example the front side. This may be a dipole or various dipole embodiments, or a patch antenna with its known embodiments. To reach a minimum range of the radio sensor, antenna arrays can be used.

Below, the embodiments of the present disclosure will be described by using a patch antenna array as an example. The same may be applied to the dipole arrays as well. In particular a number of main antenna fields, especially more than five dipoles or patch fields, are provided.

To integrate a further radar antenna in the arrangement consisting of at least one main antenna, the present disclosure provides that, in addition to the at least one main antenna, one antenna structure integrated with the substrate is provided. The term "integrated with the substrate" means that the antenna structure is configured within the circuit board material (i.e., the substrate). In particular, a horn antenna integrated with the substrate is provided. A horn antenna structure integrated with the substrate refers to a horn antenna. A typical, traditional horn antenna is formed from a metal, hollow waveguide with a funnel-shaped opening. In a horn antenna integrated with the substrate, the horn antenna is provided by an electrical connection of the top and bottom of the electrical conductor. Typically in circuit boards, the top and bottom conductive layer is achieved by VIAs or galvanic bridges. In the simplest case, a slit is cut into the substrate and an electrical connection between the top conductor and the bottom conductor is established for example by means of a galvanic method. An electrical bridge is created between the conductive layers. If these electrically conductive bridges are arranged so that they correspond to a waveguide for the wavelength of the range that is of interest for the radar antenna and if these bridges lead to the edge of the substrate, a supplied electromagnetic wave will detach at the latest on the substrate ends into the free space, causing the antenna structure to function as an antenna. When additionally diverging the waveguide from the electrical bridges before the substrate edge at an angle, a horn antenna is recreated. This funnel shape determines in the known manner the radiation characteristic and the reception characteristic of the horn antenna. What is ultimately obtained is a horn antenna integrated with the substrate with a waveguide feed.

If using, instead of the galvanic bridges, through connections, which generally become an electrically conductive VIA by means of through-holes or blind holes, and are then galvanically processed, the hole size and the distance determine the waveguide quality. Whether the electrically conductive VIAs are completely electrically conductive or only at the edges is irrelevant. Both embodiments are possible. Experience has shown that small holes and the closest distance between the holes is advantageous. It is possible to combine the milled bridges with the holes so that curves, steps, and complex paths of the waveguide from the feed-in to the edge of the substrate are made possible.

This way, it is also possible to configure the formed horn of a horn antenna structure as a corrugated horn to suppress secondary lobes in the radiation characteristic.

It is also possible to configure a slot antenna as an antenna structure integrated with the substrate. To this purpose, the waveguide integrated with the substrate must also be taken to the edge of the substrate. In contrast to the horn antenna with a diverting waveguide structure toward the edge, in a slot antenna the waveguide structure is closed at the edge so far that only an opening or slot that corresponds to the operating wavelength remains.

It is irrelevant whether the substrate consists of more than or just one layer, as long as the total thickness is consistent with the operating wavelength. To configure a good wavelength, at least ½*operating wavelength/square root (dielectricity constant of the substrate) must be configured in height and width. The preferred operating frequencies provided are frequencies of greater than 10 GHz (<3 cm operating wavelength).

The feed of the main antenna on the first side or front side of the circuit board material may be configured in the known manner. A patch antenna is, for example, fed with electromagnetic energy from a micro strip-line on top of the substrate. A dipole may be fed on the front side from a fin-line.

To achieve a feed into the waveguide of the antenna structure integrated with the substrate, it is preferred to place a blind cutout with galvanic full or partial filling at the place where the feeder cable of the main antenna crosses with the waveguide integrated with the substrate. The coupling is performed in the known manner and method and the same used to couple into a waveguide, either by means of a small opening as a radiation coupling or as a coaxial feed. To achieve a certain weighting of the radiation energy of the main antenna with the configured antenna structure integrated with the substrate, a 6 db, 10 dB, 20 dB coupler or any other coupling factor may be applied to the feed of the first antenna.

An antenna on the second side or back side of the circuit conductor, which is co-excited by the coupling of the feed at the front side, may be handled in the same way.

If the goal was to achieve a quasi-360° (over 300°) all-around detection, the waveguides integrated with the substrate would have to be taken to all the edges of the substrate, horn or slot antennas would be formed there, and another antenna would be added on the back side in addition to the main antenna on the front side. All antennas are fed by the same power supply network of the main antenna.

To achieve an adaptation to 50 Ohms in the shared feeding point, the individual antennas preferably have a high impedance. If a patch antenna is excited at its radiation edge, 200 to 250 Ohm input impedances are possible. In the same way, the waveguide integrated with the substrate may be fed in at the location where there is a 200 Ohm impedance. At 4×200 Ohms, the desired 50 Ohms are present at the shared feed. Alternatively, any desired impedance that is preferred for the respective embodiment and application can be generated by means of an impedance transformation and interconnected.

Any antenna structure integrated with the substrate therefore comprises the following components. Several cutouts (slots and/or cutouts) are formed or provided in the substrate and arranged to form a waveguide. A feeder cable for the antenna structure formed by the electrically conductive layer of one of the two sides of the circuit board is configured to feed an electromagnetic wave into the antenna structure integrated with the substrate.

The present disclosure provides that an antenna structure of a second radar antenna integrated with the substrate can be provided on a shared circuit board of a first radar antenna as the main antenna and in addition to any main antenna without having to arrange the patch fields at a greater distance from each other than without the horn antenna structures. Any horn antenna structure uses a range or a location in the circuit board that is not needed anyway for the provision of the main antenna.

The present disclosure includes further developments whose features result in additional advantages.

As already explained, the at least one main antenna is located on the first side of the substrate and optionally on the second side of the substrate. It can be created there in the known manner by means of an etching technology to form circuit boards. Preferably, each feeder cable of the at least one antenna structure is located on the first side. Here, it is provided that each feeder cable is connected to a supply line for the at least one main antenna, which is formed by the first layer. Alternatively, the supply line of the main antenna may be at the same time the supply line of the antenna structure. In other words, every main antenna is supplied together with its respective antenna structure by one and the same supply line. This has the advantage that they synchronously send and receive via the at least one patch field on the one hand and the at least one antenna structure on the other. No complex coordination is required.

Regarding the cutouts of each antenna structure, it is preferred that its longitudinal extension directions, i.e., the course or direction of the cutouts, are parallel to each other. In this way, the material arranged in the cutouts acts on electromagnetic waves of the same polarization. Consequently, the cutouts and their material can jointly act on an electromagnetic wave. The distance of the cutouts to each other is preferably smaller than 10 mm, in particular smaller than 7 mm. Additionally or alternatively, it is preferred that the cutouts are positioned vertically to an extension plane of the circuit board. In other words, the longitudinal extension directions of the cutouts are positioned from the first side to the second side (or vice versa). This way, the material in all the cutouts blocks a spreading of an electromagnetic wave within the substrate out of the funnel shape.

Overall, it is preferred that the material arranged in the cutouts of any antenna structure acts as a wave fence or wave cage on the waves of the alternating field that the feeder cable feeds into the funnel shape.

Preferably, the cutouts, or at least some of the cutouts, are each provided in the substrate as a so-called VIA throughhole. This has the advantage that the cutouts can be produced by means of an automated production process. The electrically conductive material may be inserted or arranged in the cutouts for example by means of an electrode-positive, electrolytic method.

The electrically conductive material arranged in the cutouts is preferably short-circuited by means of the electrically conductive layer of the first side and/or the second side. This amplifies or strengthens a blocking effect of the electrically conductive material for electromagnetic waves in the funnel shape.

While the at least one patch field is formed by the electrically conductive layer of the first side, the electrically conductive layer of the second side is preferably provided or configured also as a reflector for each patch field. This way, a main radiation direction of the at least one patch field for electromagnetic waves is specified vertically to the patch field to the first side. This reduces leakage radiation from the second side.

With the described arrangement of the cutouts on the one hand and the at least one patch field on the other, the preferred result is that a respective main radiation direction of each patch field on the one hand and a respective main radiation direction of each of the additionally arranged antenna structures on the other are positioned vertically to each other or at least at an angle range of 70° to 110°. This arrangement determines therefore with the at least one patch field on the one hand and with the at least one antenna structure on the other a respectively different detection range so that a combined or summed radiation characteristic of the antenna device (overall characteristic) is provided with which the detection range can be covered as is necessary, for example, for a radar detector of a motor vehicle.

Accordingly, the present disclosure also provides for a motor vehicle with at least one radar detector for detecting objects in an environment of the motor vehicle and/or for detecting objects in an interior of the motor vehicle. According to embodiments of the present disclosure, the at least one radar detector is configured so that it comprises an embodiment of the antenna device according to the present disclosure.

The motor vehicle according to the present disclosure is preferably an automobile, preferably a passenger vehicle or a truck.

BRIEF DESCRIPTION OF THE DRAWINGS

Other advantages, features and details of the present disclosure result from the claims, the description of embodiments below, and the drawings, in which:

FIG. 4 shows a schematic representation of a top view of an example antenna device according to embodiments of the present disclosure;

FIG. 5 shows a schematic representation of a sectional view of an example antenna device according to embodiments of the present disclosure; and FIG. 6 shows a diagram of a radiation characteristic of an example antenna device according to embodiments of the present disclosure.

The components of the embodiments of the present disclosure each constitute separate features of the present disclosure that must be viewed independently from each other, and which each develop the present disclosure independently from each other and must therefore be considered individually or in a combination different from the one shown as part of the present disclosure. Furthermore, the described embodiments can be supplemented by other features of the present disclosure described as well.

Elements with the same function must be provided with the same reference signs in the figures.

DETAILED DESCRIPTION

Figure 1:
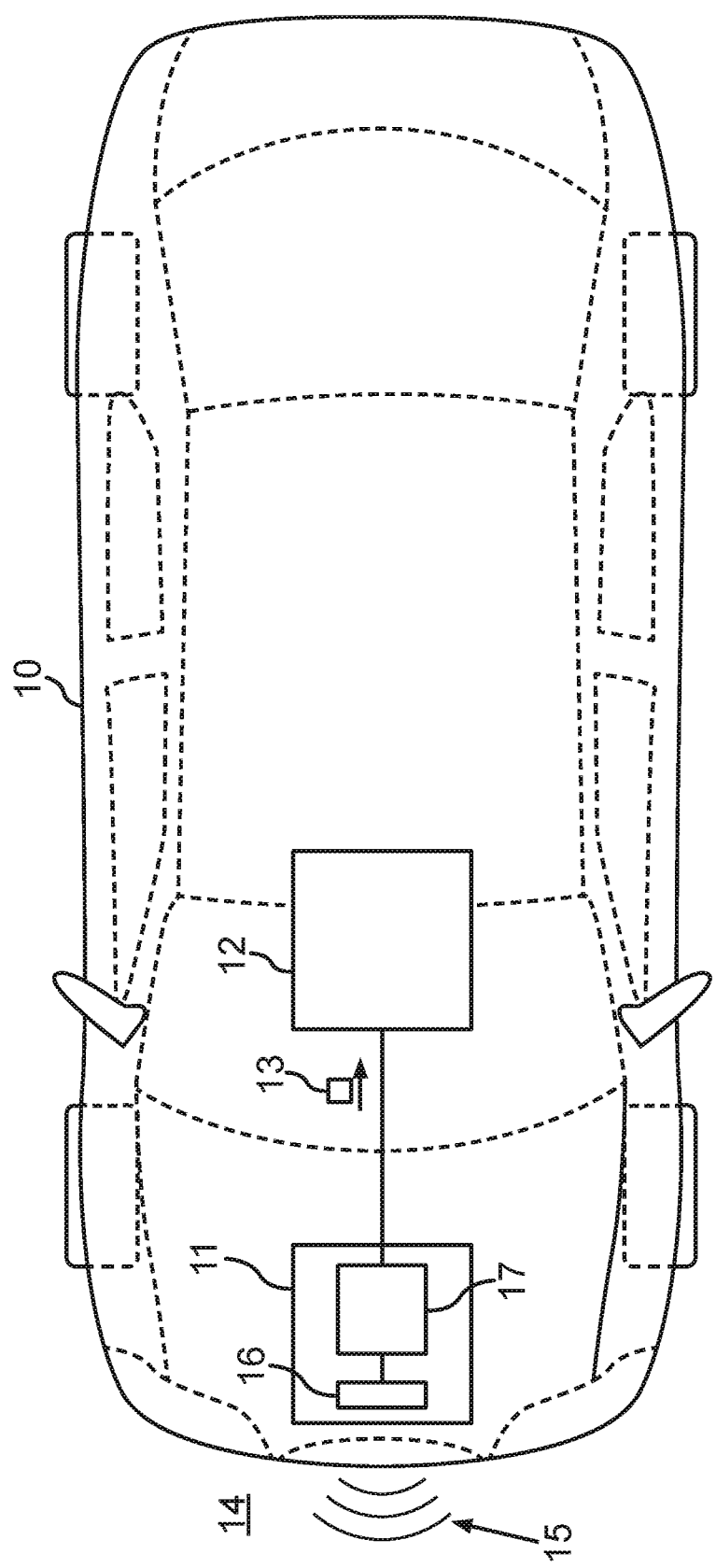
FIG. 1 shows a schematic representation of an example motor vehicle with a radar detector according to embodiments of the present disclosure.

FIG. 1 shows a motor vehicle 10 which is a passenger motor vehicle, for example.

What is shown is a radar detector 11 and a driver assistance system 12. The driver assistance system 12 is able to receive detection signals 13 from the radar detector 11, which describe for example objects in an environment 14 of the motor vehicle 10 or depend on their location. The radar detector 11 may comprise an antenna device 16 for sending electromagnetic waves 15 into the environment and for receiving waves reflecting from the objects. A frequency of the electromagnetic waves 15 may be in a range from for example 6 GHz to 140 GHz. The antenna device 16 may be operated in the known manner by an electronic control device 17 of the radar detector 11.

Figure 2:
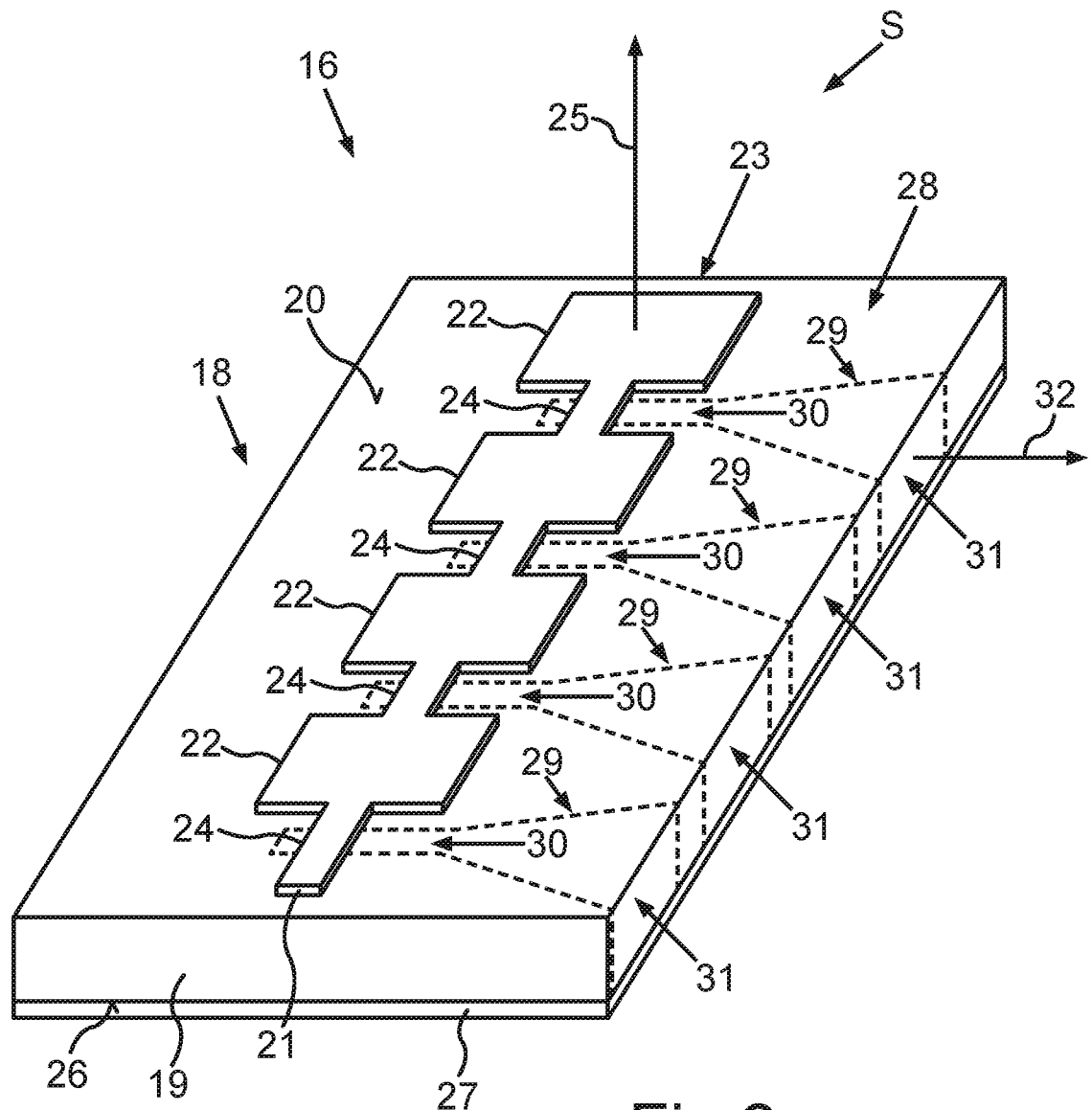
FIG. 2 shows a schematic representation of an example antenna device according to embodiments of the present disclosure.

FIG. 2 shows the antenna device 16 by itself. The antenna device 16 may be provided on the basis of a circuit board 18 (PCB). The circuit board 18 may comprise in the known manner an electrically insolating circuit board substrate or substrate 19 in short, which may comprise for example a fiber-reinforced plastic such as the material FR-4 or preferably Ro3003.

On a first side or front side 20, an arrangement from one or (as shown) several patch fields 22 may be configured on the basis of an electrically conductive layer 21 for providing a patch antenna 23. For the transmission of an electromagnetic energy or wave into the patch fields 22, feed lines 24 are provided in the layer 21 as well. The layer 21 may, for example, be formed from copper or aluminum. The patch antenna 23 comprises a main radiation device 25 due to the arrangement of the patch fields 22 shown, which points vertically away from the front side 20. The main radiation direction 25 is illustrated in FIG. 2 only for a single patch field 22. A second side or back side 26 of the circuit board 18 comprises an electrically conductive layer 27 as well, which acts as a reflector for the patch antenna 23. The material of the layer 27 may correspond to the material of the layer 21.

In the antenna device 16, a horn antenna assembly 28 integrated with the substrate is provided by means of the circuit board 18 in addition to the patch antenna 23. To this purpose, a horn antenna structure 29 is formed or configured as an antenna structure in the substrate 19 in addition to at least one patch field 22. For feeding in electromagnetic energy as an electromagnetic wave in every horn antenna structure 29, the feed lines 24 can be used in the embodiment shown in FIG. 2, which are each electrically connected or radiation-coupled with a feeder range 30 of a respective horn antenna structure 29. An electromagnetic wave fed in the feeder range 30 is directed by a funnel shape 31 of the respective horn antenna structure 29 in a main radiation direction 32 and radiated from the substrate 19. The main radiation direction 32 is illustrated in FIG. 2 only for a single horn antenna structure 29. The funnel shape 31 is open in the direction of the main radiation direction. This opening is, in particular, located at an edge of the substrate 19.

Figure 3:
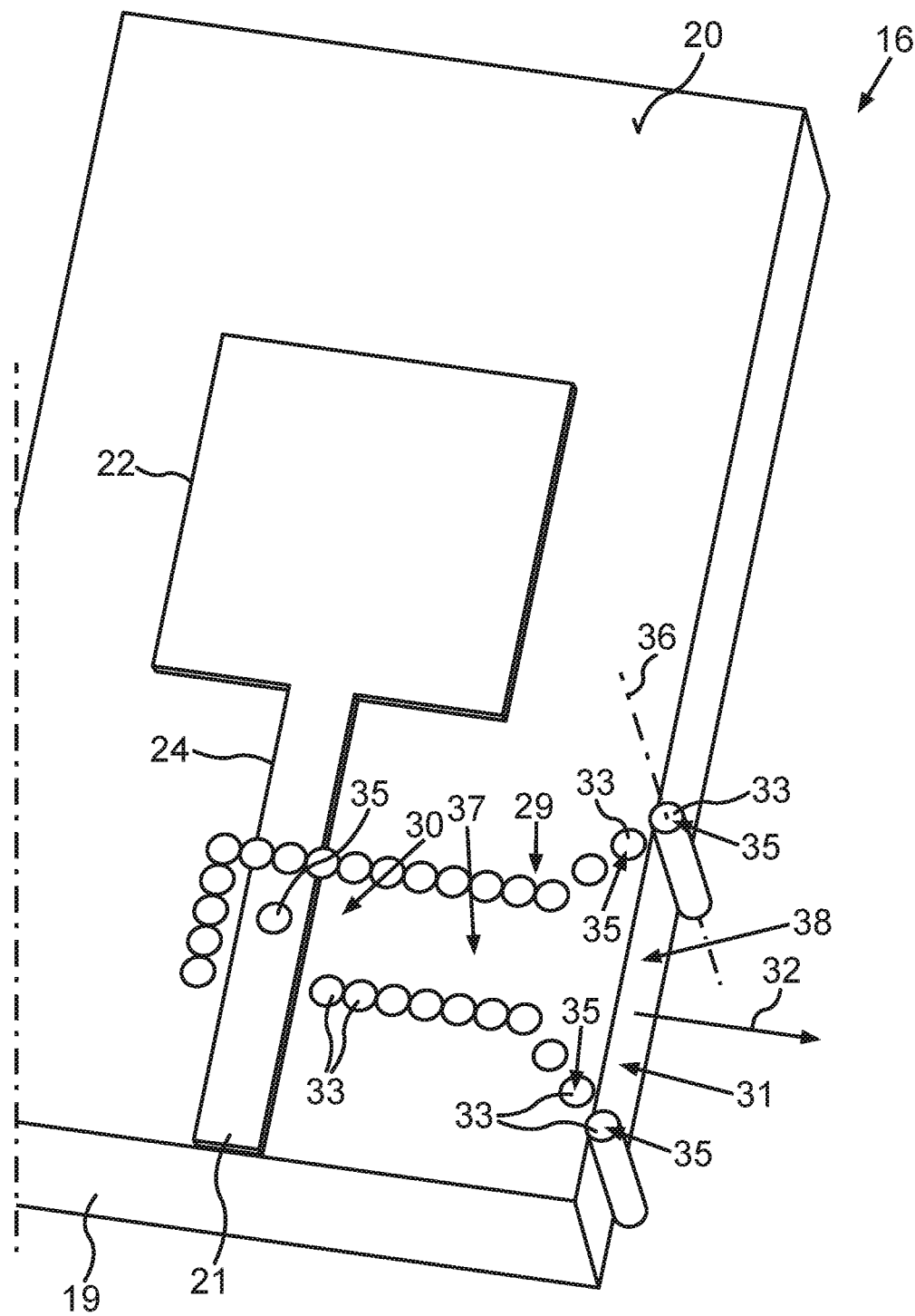
FIG. 3 shows a schematic representation of an example antenna device according to embodiments of the present disclosure.

FIG. 3 illustrates how the funnel shape 31 of a single horn antenna structure 19 can be formed or provided in the substrate 19. Each horn antenna structure 29 provides cutouts for this purpose in the form of cutouts 33 in the substrates to reproduce a waveguide or a waveguide structure. For the sake of clarity, FIG. 3 only shows a few of the cutouts with a reference sign.

In each of the cutouts 33, an electrically conductive material may be arranged, for example zinc or copper or aluminum. In the feeder range 30, a cutout 34 may be provided in the substrate 19 inside the funnel shape 31 in which electrically conductive material is arranged that is electrically connected with the feeder line 24. The electrically conductive material 34 in the other cutouts 33 is, however, preferably electrically insulated against the feeder line 24 and the patch field 22.

The cutouts 33 are preferably arranged parallel to each other along their respective longitudinal extension direction 36. The longitudinal extension direction 36 is preferably vertical to the surfaces of the front side 20 and the back side 26. The cutouts 33 may be configured in the substrate 19 in particular as so-called VIAs. They may be drilled, for example. The arrangement of the cutouts 33 is chosen in such a way that the funnel shape 31 is created. The cutouts 33 form a wave fence, which delimits an expansion range 37, which, starting from the feeder range 30, has a widening shape toward an exit opening 38. An electromagnetic wave generated in the funnel shape 31 exits from the exit range 38 into the environment 14.

FIG. 4 shows a top view of an alternative design of the funnel shape 31. The funnel shape 31 ends at an edge 39 of the substrate 19 with the exit range 38. The feeder range 30 with the cutout 35 is arranged at a distance from the feeder line 24 and galvanically coupled with the same by means of a supply line 40. The coupling between the supply line 40 and the cutout 35 may be purely capacitive, i.e., nongalvanic, as well.

FIG. 5 illustrates the arrangement of the cutouts 33 in the substrate 19. It shows how an electrical insulation 41 is provided between the layer 21, in particular the supply line 24 and the patch field 22 on the one hand and the electrically conductive material 35 in the cutouts 33 on the other. It furthermore illustrates how the electrically conductive material 35 in the cutouts 33 on the back side 26 can be electrically, in particular galvanically, joined by means of the electrically conductive layer 27.

FIG. 6 illustrates a resulting radiation characteristic or overall characteristic 42 that results from a radiation characteristic 43 of the patch antenna 23 and a radiation characteristic 44 of the horn antenna assembly 28. By adjusting a number of the patch fields 22 and the horn antenna structures 29, the radiation characteristics 43, 44 can be adapted to a target characteristic 45.

The antenna devices shown are therefore a combination from the forward-pointing patch antenna with a known radiation characteristic and a further horn antenna arrangement, whereby no further space is needed on the circuit board for this further antenna. This is achieved by the combination of patch antennas 23 as a traditional forward-pointing surface transmitter with a waveguide integrated with the substrate or wave fence, which is formed on the circuit board edge 39 into a horn antenna structure and which is preferably placed at a right angle to the antenna characteristic of the patch antenna. In this way, the detection range of the radar sensor broadens without occupying valuable circuit board space. Whether this antenna integrated with the substrate is arranged on the right, left, or on both sides in relation to the main antenna is irrelevant and is determined by the application case.

In the case of a radar sensor with a far reach, a typical series of patch fields, i.e., a patch antenna column, is combined with a waveguide integrated with the substrate in the form of a horn antenna. Since the horn antenna integrated with the substrate may be placed below the path antenna, both antenna structures together only occupy a circuit board surface of a single antenna.

To this purpose, a traditional patch antenna with a radiating element is applied to the front side with the feeder network in a circuit board (with a high-frequency substrate). As a reactor, the opposite side of the substrate is used as a reflector (circuit board laminated on both sides). In addition, cutouts 33 are applied to the substrate as through-holes (VIAs) between the top side and back side. These VIAs may be coated on the inside with copper in an electrode-positive, electrolytic process so that they become conductive.

The distances and arrangement of the VIAs met be arranged so that they represent or recreate a circuit board for 77 GHz. If opening a circuit board on one side and forming the opening in the shape of a funnel, a horn antenna is created.

The feeder network of the patch antenna is tapped in a galvanically directed or (inductively or capacitively) coupled manner and coupled into the recreated circuit board so that the performance is distributed to both antenna types (patch and horn). The distribution may be controlled by means of the coupling degrees of the coupling. Both antenna types are therefore excited via the same feeding point.

The antenna characteristic, which is arranged at a right angle, leads to the resulting antenna diagram 42 with a very wide detection range. This results in two radiation diagrams 43, 44, one of a patch antenna and another from the horn antenna integrated with the substrate at a right angle from each other, which ultimately cover the entire desired detection range. The results of the high-frequency stimulation are illustrated in FIG. 6 and show that an implementation can be performed without any problems and that the desired effects of an improved monitoring range and a smaller need of space on the circuit board are obtained.

To increase the range, the patch/horn antenna combination may be arranged into an antenna column S as illustrated in FIG. 2.

Consequently, there is more space available on the same circuit board surface for antennas which may be used for a greater reach, improved resolution of the objects, and/or performance increase with a seamless monitoring. Furthermore, both antenna types are excited with the same feeding points which, in turn, leads to a reduction of the feeder network and space requirement.

The example shows how the present disclosure can provide an antenna for radar application with a double or superimposed radiation characteristic.

The invention claimed is:

1. An antenna device for a radar detector, comprising:
a circuit board having an electrically insulating substrate having a first side and a second side opposite the first side, wherein a respective electrically conductive layer is positioned on each of the first and second sides of the electrically insulating substrate, and wherein the electrically conductive layer positioned on the first side of the electrically insulating substrate forms at least one main antenna and at least one feeder cable electrically coupled to the at least one main antenna, the at least one main antenna being a patch antenna; and
at least one antenna structure integrated with the electrically insulating substrate, wherein the at least one antenna structure integrated with the electrically insulating substrate comprises a plurality of cutouts which are formed in the electrically insulating substrate and arranged in a waveguide, wherein an electrically conductive material is arranged at least partially in each cutout, and wherein the feeder cable formed by the electrically conductive layer positioned on the first side of the electrically insulating substrate is further electrically coupled to the electrically conductive material of at least one cutout of the plurality of cutouts, and is configured for simultaneously feeding an electromagnetic wave into the at least one main antenna and the at least one antenna structure integrated with the electrically insulating substrate.

2. The antenna device according to claim 1, wherein each feeder cable is connected with a supply line formed by the electrically conductive layer of the first side of the electrically insulating substrate of the at least one main antenna.

3. The antenna device according to claim 1, wherein the electrically conductive material arranged at least partially in at least one cutout is configured as a wave fence or wave cage for electromagnetic waves fed into the waveguide by means of the feeder cable.

4. The antenna device according to claim 1, wherein each cutout of the plurality of cutouts extends in a longitudinal direction, such that the cutouts are arranged parallel to each other or vertical to an extension plane of the circuit board.

5. The antenna device according to claim 1, wherein the electrically conductive material arranged at least partially in each cutout is electrically short-circuited by means of the electrically conductive layer of at least one of the first side or the second side.

6. The antenna device according to claim 1, wherein an electrically conductive layer of a second side of the electrically insulating substrate is formed as a reflector for the at least one main antenna.

7. The antenna device according to claim 1, wherein a respective main radiation direction of the at least one main antenna and a respective main radiation direction of the at least one antenna structure are oriented vertically to each other or in an angle range of 70° to 110° with respect to each other.

8. The antenna device according to claim 1, wherein the at least one main antenna is formed in a rectangular shape.

9. A motor vehicle with at least one radar detector for detecting objects in at least one of an environment of the motor vehicle or an interior of the motor vehicle, wherein the at least one radar detector comprises an antenna device, the antenna device comprising:
   a circuit board having an electrically insulating substrate having a first side and a second side opposite the first side, wherein a respective electrically conductive layer is positioned on each of the first and second sides of the electrically insulating substrate, and wherein the electrically conductive layer positioned on the first side of the electrically insulating substrate forms at least one main antenna and at least one feeder cable electrically coupled to the at least one main antenna, the at least one main antenna being a patch antenna; and
   at least one antenna structure integrated with the electrically insulating substrate, wherein the at least one antenna structure integrated with the electrically insulating substrate comprises a plurality of cutouts which are formed in the electrically insulating substrate and arranged in a waveguide, wherein an electrically conductive material is arranged at least partially in each cutout, and wherein the feeder cable formed by the electrically conductive layer positioned on the first side of the electrically insulating substrate is further electrically coupled to the electrically conductive material of at least one cutout of the plurality of cutouts, and is configured for simultaneously feeding an electromagnetic wave into the at least one main antenna and the at least one antenna structure integrated with the electrically insulating substrate.

10. The antenna device according to claim 1, wherein at least a subset of the cutouts are provided as VIA throughholes extending from the first side of the electrically insulating substrate to the second side of the electrically insulating substrate.

11. The motor vehicle according to claim 9, wherein at least a subset of the cutouts are provided as VIA throughholes extending from the first side of the electrically insulating substrate to the second side of the electrically insulating substrate.

* * * * *